Mar. 3, 1925.

A. M. BROWN 1,528,364

ELECTRIC WELDING APPARATUS

Filed April 24, 1924

Inventor
Aldrich M. Brown.

By
Eccleston & Eccleston.
Attorneys

Mar. 3, 1925.
A. M. BROWN
1,528,364
ELECTRIC WELDING APPARATUS
Filed April 24, 1924    2 Sheets-Sheet 2
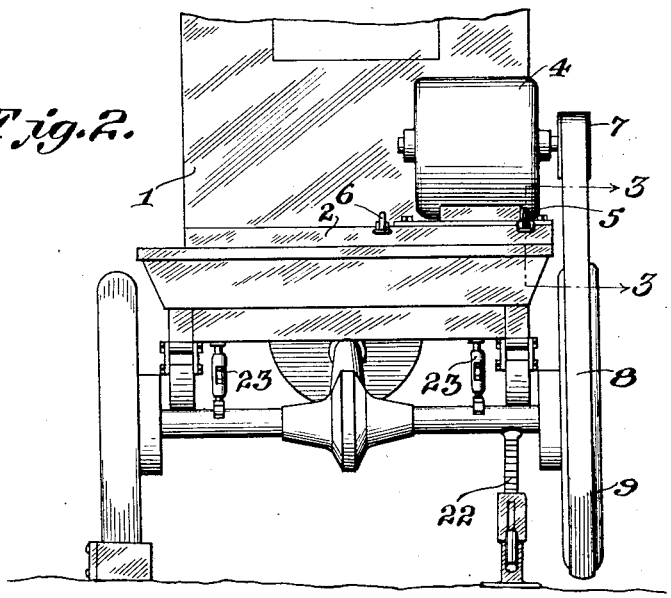
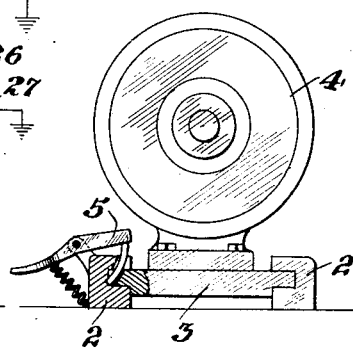
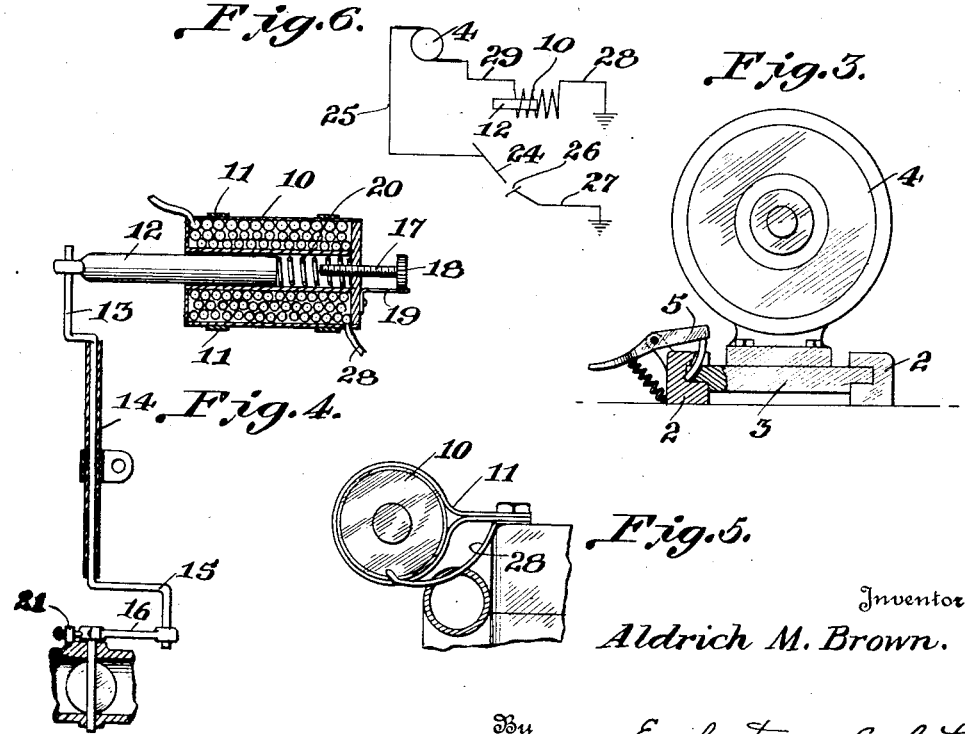
Inventor
Aldrich M. Brown.
By Eccleston & Eccleston
Attorney Patented Mar. 3, 1925.

1,528,364

UNITED STATES PATENT OFFICE.

ALDRICH M. BROWN, OF MOBILE, ALABAMA, ASSIGNOR OF ONE-FOURTH TO H. C. JONES, ONE-FOURTH TO F. E. WEST, AND ONE-FOURTH TO G. L. McLAREN, ALL OF MOBILE, ALABAMA.

ELECTRIC WELDING APPARATUS.

Application filed April 24, 1924. Serial No. 708,723.

*To all whom it may concern:*

Be it known that I, ALDRICH M. BROWN, a citizen of the United States, residing at Mobile, in the county of Mobile and State of Alabama, have invented certain new and useful Improvements in Electric Welding Apparatus, of which the following is a full, clear, and exact description.

This invention relates to electric welding apparatus and has for its object to provide such a device which may be mounted on an automobile in such manner as to permit the use of the automobile engine for driving the generator which provides the welding current.

Another object of the invention resides in the provision of a solenoid by means of which the speed of the engine may be automatically controlled during the welding process.

A further object of the invention consists in the provision of means for mounting the generator so that the same may ordinarily be secured intermediate the sides of the automobile and also may be secured at one side thereof when in operation.

Other objects and advantages of the invention will be apparent from the following description when taken in connection with the accompanying drawings, in which, Figure 1 is a side elevation of an automobile with my apparatus in operating position.

Figure 2 is a fragmentary rear elevation of the apparatus in use.

Figure 3 is a slightly enlarged end elevation of the generator with its mounting partly broken away along line 3—3 of Figure 2.

Figure 4 is a sectional detail view of the engine throttle valve and controlling means therefor.

Figure 5 is a detail view of the mounting of the solenoid on the engine, and,

Figure 6 is a diagrammatic view of the wiring.

Figure 1:
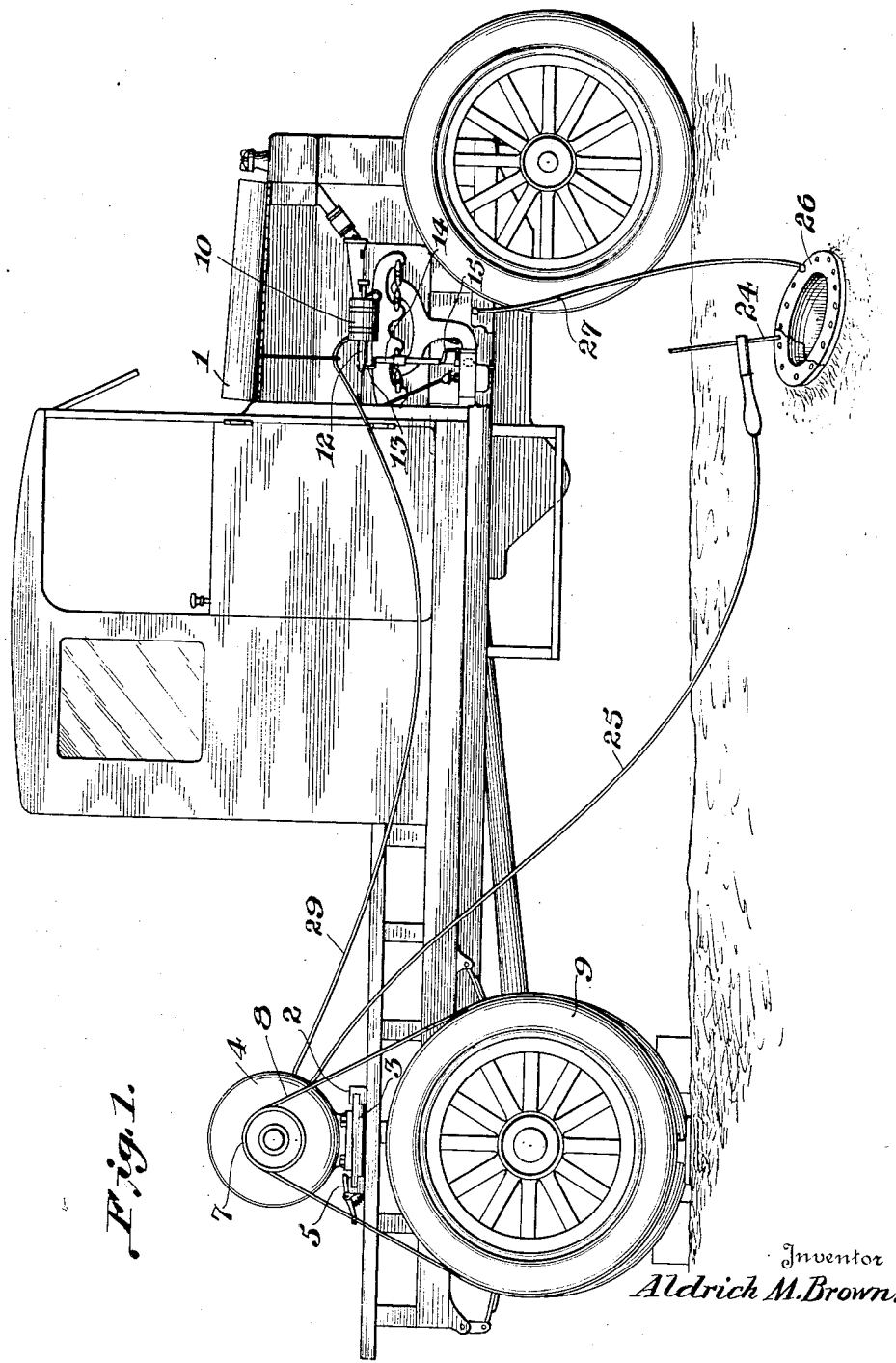

Referring to the drawings more in detail the numeral 1 indicates generally any type of automobile to which my apparatus may be applied. Mounted on the rear of the body portion of the vehicle are a pair of transversely extending guideways 2—2 in which is slidably mounted the dynamo platform 3 carrying a dynamo 4. A pair of spring-pressed latches 5—6 are mounted on one of the guideways 2 and the former provides means for locking the platform 3 and dynamo 4 over at one side of the vehicle, as shown in Figure 2, while the latch 6 may engage the platform when it is moved to its position midway of the sides of the vehicle. By this construction the dynamo may be rigidly held in place over one of the driving wheels of the automobile when in operation and may also be locked at an intermediate position when being transported to the point of operations.

The dynamo 4 is provided with a pulley 7 which is operated through the medium of a belt 8 which is adapted to be driven by one of the driving wheels 9 of the automobile when lifted off the ground.

Obviously some means should be provided for speeding up the dynamo when a relatively large current is desired and for reducing it to idling speed when a welding current is not needed. To this end I provide a solenoid placed in series with the dynamo. This solenoid is indicated by the numeral 10, and while it may be mounted in any suitable position I have shown the same attached to the bolt heads of the engine by means of the bands 11. The plunger 12 of the solenoid is operatively connected to a crank 13 which is rotatably mounted in the vertically extending bearing 14. A crank 15 is provided on the lower end of crank 13 and is operatively connected to the arm 16 which operates the throttle valve for controlling the flow of explosive gases to the engine cylinders.

It will be understood of course that the amount of current required to make a perfect weld will vary with conditions and I have accordingly provided an adjusting screw 17 in the end of solenoid 10. This screw is formed with a knurled head 18 which is engaged by detent 19 for releasably holding the same in adjusted position. A coil spring 20 has for its purpose to normally throw the plunger 12 to the outer limit of its stroke which limit is provided by means of the stop 21 on the carbureter or at any other suitable point. It will thus be apparent that two stops are provided, stop 21 which will prevent the throttle valve from being closed to a point beyond that necessary for the ordinary idling speed of the engine, and stop 17 which may be adjusted to vary the maximum opening movement of the valve through contact of the inner end of the plunger 12 with the inner end of the screw.

In putting the apparatus in operation the latch 6 is disengaged from the generator so as to permit the same to be moved to the side of the automobile and again locked by means of latch 5; the machine is then jacked up on one side by means of jack 22 as indicated in Figure 2. The belt 8 is now applied to wheel 9 and pulley 7 and turnbuckles 23 are then expanded between the rear axle and the body of the automobile so as to tighten the belt 8 and prevent any relative movement between the wheel 9 and pulley 7 while the apparatus is in operation.

The welding implement or arc forming element is indicated by the numeral 24 and is electrically connected to the generator 4 by means of wire 25. The article 26 which is to be welded, or a metal plate on which such article may rest, is grounded to the frame-work of the automobile by wire 27, and the solenoid 10 is also grounded to the framework by means of wire 28. The solenoid is also connected in series with the generator 4 by means of the electrical conductor 29 as clearly shown in Figures 1 and 2.

In the operation of the device the elements are arranged as already described and as shown in Figures 1 and 2, except that the welding implement 24 is out of contact with the article 26 to be welded. The engine is now started and will run at the ordinary idling speed due to the fact that the springs 10 will push out the plunger 12 and through the medium of the cranks 13 and 15 and stop 21 hold the throttle valve in its nearly-closed position. The welding implement 24 is now placed in contact with the work 26 and immediately drawn away slightly to form the arc. As soon as contact is made between elements 24 and 26 current will pass through the solenoid 10 and draw the plunger 12 inward against the pressure of spring 20 until it engages the stop 17. This movement of the plunger will of course open the throttle valve and speed up the engine thus producing the welding current desired. If it becomes necessary to increase or decrease the welding current this may be accomplished by varying the position of the stop 17 in the solenoid 10. If the arc is broken for any reason the plunger will be again forced outwardly by means of spring 20 and the throttle valve partly closed to slow down the engine to idling speed.

From the foregoing description taken in connection with the accompanying drawings it will be apparent that I have devised an exceedingly simple arrangement of welding elements and mobile power plant by means of which welding operations may be easily and quickly performed at points remote from the shop, and also an automatic controlling means by which the power plant is set in operation or stopped as required.

In accordance with the patent statutes I have described what I now believe to be the best embodiment of the invention, but I do not wish to be understood thereby as limiting myself or the scope of the invention, as many changes and modifications may be made without departing from the spirit of the invention; all such I aim to include in the scope of the appended claims.

What I claim as new and desire to secure by Letters Patent is:

1. The combination with an internal combustion engine of a generator, means operated by the internal combustion engine for running said generator, means electrically connected with the generator for controlling the internal combustion engine, and a welding tool electrically connected to the generator.

2. The combination with an internal combustion engine, of a generator operated by the internal combustion engine, an electric welding tool connected to the generator, and means for controlling the operation of the internal combustion engine, said means being controlled by the operation of the welding tool.

3. The combination with an automobile, of a generator, means operated by the automobile engine for running said generator, means connected in series with the generator for controlling the automobile engine, and a welding tool electrically connected to the generator.

4. The combination with an automobile, of a generator, a solenoid in series with said generator, means operatively connecting the plunger of the solenoid with the throttle valve of the automobile engine, and a welding tool electrically connected to the generator.

5. The combination with an automobile, of a generator, a solenoid in series with said generator, means operatively connecting the plunger of the solenoid with the throttle valve of the automobile engine, means for limiting the extent of movement of the plunger, and a welding tool electrically connected to the generator.

6. The combination with an automobile, of a generator, a solenoid in series with said generator, means operatively connecting the plunger of the solenoid with the throttle valve of the automobile engine, a screw for varying the extent of movement of the plunger, and a welding tool electrically connected to the generator.

7. The combination with an automobile, of a generator, a solenoid in series with said generator, means operatively connecting the plunger of the solenoid with the throttle valve of the automobile engine, a welding tool electrically connected to the generator, said solenoid and the article to be welded being grounded to the framework of the automobile.

ALDRICH M. BROWN.